United States Patent Office 3,192,257
Patented June 29, 1965

3,192,257
RING D-SECO-19-NOR-ANDROSTANE
DERIVATIVES
John A. Zderic, Palo Alto, Calif., assignor, by mesne assignments, to Syntex Corporation, a corporation of Panama
No Drawing. Filed Dec. 11, 1961, Ser. No. 158,538
2 Claims. (Cl. 260—514.5)

The present invention relates to novel cyclopentanophenanthrene derivatives and to a process for the production thereof. More particularly the present invention relates to ring D-seco-19-nor-androstane derivatives.

The novel compounds of the present invention, which are anti-androgenic agents and also exhibit anti-gonadotrophic properties, are represented by the following formulas:

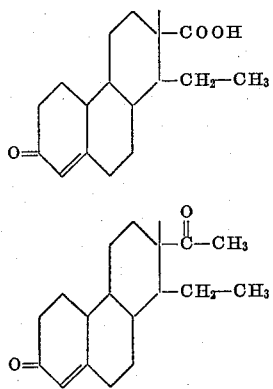

The novel compounds represented by the above formulas are prepared by the process exemplified by the following equation:

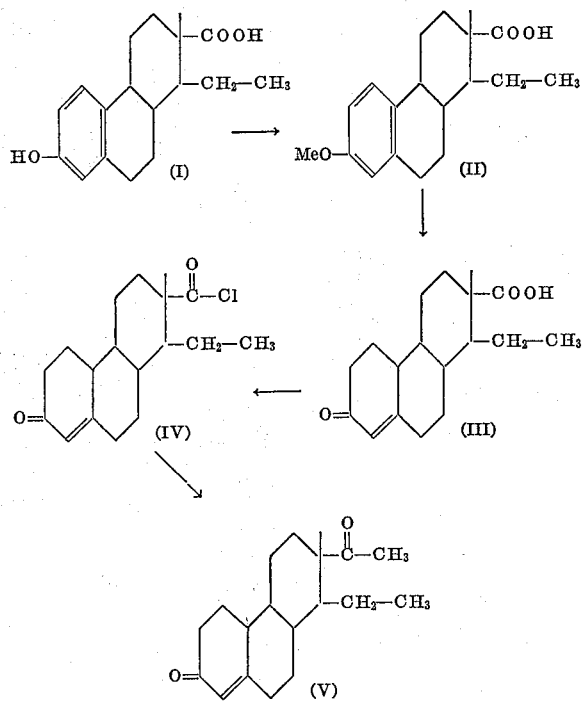

In practicing the process outlined above the starting compound, which is 16,17-seco-$\Delta^{1,3,5(10)}$-estratrien-3-ol-17-oic acid (I), is treated with dimethyl sulfate in a strongly basic medium, such as potassium hydroxide solution, thus affording 16,17-seco-3-methoxy-$\Delta^{1,3,5(10)}$-estratrien-17-oic acid (II). Treatment of this compound by the Birch procedure, namely with lithium in liquid ammonia, furnished the corresponding 3-methoxy-$\Delta^{2,5(10)}$ compound which, upon hydrolysis in a strongly acid medium such as hydrochloric acid, gives 16,17-seco-19-nor-$\Delta^4$-androsten-3-one-17-oic acid (III). Reaction of this compound or the sodium salt thereof with oxalyl chloride yields the corresponding acyl chloride (IV) which upon treatment with dimethyl cadmium in a suitable solvent such as ether for a period of time of the order of 20 hours gives 17-methyl-16,17-seco-19-nor-$\Delta^4$-androstene-3,17-dione (V).

Example I

To a boiling solution of 5 g. of 16,17-seco-$\Delta^{1,3,5(10)}$-estratrien-3-ol-17-oic acid in 500 cc. of ethanol were added a total of 20 cc. of dimethyl sulfate and a solution of 80 g. of potassium hydroxide in 50 cc. of water, with continued boiling. The two liquids were added alternatively in portions of 5 cc. of each over a period of 30 minutes. The mixture was boiled for a further 45 minutes, then cooled, poured into ice water and neutralized with hydrochloric acid. The resulting precipitate was collected, washed with water and dried. Crystallization from chloroform-methanol gave 16,17-seco-3-methoxy-$\Delta^{1,3,5(10)}$-estratrien-17-oic acid.

Example II

A cold solution of 5 g. of the foregoing steroid in 750 cc. of anhydrous ether was added to 900 cc. of liquid ammonia and then 7.0 g. of lithium wire over 10 minutes, with constant stirring. The mixture was stirred for 20 minutes more, 160 cc. of absolute ethanol were then cautiously added and the ammonia was allowed to evaporate. Water was added to the residue, the ether distilled off and the resulting 16,17-seco-3-methoxy-$\Delta^{2,5(10)}$-estradien-17-oic acid collected, washed with water and dried.

A mixture containing the above compound, 220 cc. of methanol and 132 cc. of 3 N hydrochloric acid was heated at 60° C. for 18 minutes. The solution was cooled, poured into iced water and the resulting precipitate was collected, washed with water and dried. Crystallization from acetone-hexane yielded 16,17-seco-19-nor-$\Delta^4$-androsten-3-one-17-oic acid.

Example III 3 g. of the foregoing compound in 150 cc. of absolute ethanol containing 1 molar equivalent of sodium ethoxide was refluxed for 2 hours and then evaporated to dryness under high vacuum.

A mixture of 2 g. of the crude sodium salt and 10 cc. of oxalyl chloride was kept under anhydrous conditions and at room temperature during 2 hours. The solution was evaporated in vacuum, 2 portions of dry benzene were added and reevaporated to eliminate traces of oxalyl chloride, thus affording 16,17-seco-19-nor-$\Delta^4$-androsten-3-one-17-oic acyl chloride.

Example IV

A solution of 1 g. of the acyl chloride in 50 cc. of anhydrous ether was added to a refluxing solution of 5 g. of dimethyl cadmium [J. Cason, J. Am. Chem. Soc. 68, 2078 (1946)] in 500 cc. of anhydrous ether. After refluxing for 20 hours the mixture was poured into dilute aqueous hydrochloric acid. Ether extraction followed by washing to neutrality and evaporation of the solvent provided a crude product which upon recrystallization from ether-hexane yielded 17-methyl-16,17-seco-19-nor-$\Delta^4$-androstene-3,17-dione.

I claim:
1. 16,17-seco-19-nor-Δ⁴-androsten-3-one-17-oic acid.
2. 17-methyl - 16,17 - seco-19-nor-Δ⁴-androstene-3,17-dione.

References Cited by the Examiner

UNITED STATES PATENTS 2,830,074  4/58  Farinacci         260—514.5 X

OTHER REFERENCES

Fieser et al.: "Steroids," 1959, pp. 592–593.

LORRAINE A. WEINBERGER, *Acting Primary Examiner.*

CHARLES B. PARKER, LEON ZITVER, *Examiners.*